United States Patent
Poornachandran et al.

(10) Patent No.: US 10,254,818 B2
(45) Date of Patent: Apr. 9, 2019

(54) PRIORITY BASED APPLICATION EVENT CONTROL (PAEC) TO REDUCE POWER CONSUMPTION

(71) Applicant: Intel Corporation, Santa Clara, CA (US)

(72) Inventors: Rajesh Poornachandran, Portland, OR (US); Rajeev Muralidhar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 15/153,995

(22) Filed: May 13, 2016

(65) Prior Publication Data

US 2016/0252951 A1   Sep. 1, 2016

Related U.S. Application Data

(62) Division of application No. 14/125,439, filed as application No. PCT/US2012/057525 on Sep. 27, 2012, now Pat. No. 9,383,803.

(51) Int. Cl.
| | |
|---|---|
| G06F 1/32 | (2006.01) |
| G06F 1/3287 | (2019.01) |
| G06F 1/3206 | (2019.01) |
| G06F 1/3234 | (2019.01) |

(52) U.S. Cl.
CPC .......... G06F 1/3287 (2013.01); G06F 1/3206 (2013.01); G06F 1/3234 (2013.01)

(58) Field of Classification Search
CPC .............................. G06F 1/3206; G06F 1/3234
See application file for complete search history.

(56) References Cited

U.S. PATENT DOCUMENTS

| | | | |
|---|---|---|---|
| 5,692,204 A | 11/1997 | Rawson et al. | |
| 6,965,763 B2 * | 11/2005 | Bussan | G06F 9/4881 455/127.1 |
| 8,806,241 B2 | 8/2014 | Shimizu et al. | |

(Continued)

FOREIGN PATENT DOCUMENTS

| | | |
|---|---|---|
| CN | 101470518 A | 7/2009 |
| CN | 101515976 A | 8/2009 |

(Continued)

OTHER PUBLICATIONS

Brink, How to Enable or Disable Windows Media Center Updates to Wake Up the Computer, Nov. 1, 2010, https://www.sevenforums.com/tutorials/121903-windows-media-center-updates-enable-disable-waking-computer.html.*

(Continued)

*Primary Examiner* — Mark A Connolly
(74) *Attorney, Agent, or Firm* — Spectrum IP Law Group LLC (57) ABSTRACT

Methods and apparatus relating to Based Priority Application Event Control (PAEC) to reduce application events are described. In one embodiment, PAEC may determine which applications (and their corresponding sub-system(s)) may cause a processor or platform to exit a low power consumption state. In an embodiment, PAEC may determine which applications (and their corresponding sub-system(s)) may resume operations after a processor or platform exit a low power consumption state. Other embodiments are also claimed and disclosed.

15 Claims, 6 Drawing Sheets

(56) References Cited

U.S. PATENT DOCUMENTS

| | | | |
|---|---|---|---|
| 9,021,287 B2 | 4/2015 | Hildebrand et al. | |
| 9,383,803 B2* | 7/2016 | Muralidhar | G06F 1/3206 |
| 2004/0153867 A1 | 8/2004 | McAlinden et al. | |
| 2008/0082841 A1 | 4/2008 | Juenemann et al. | |
| 2009/0172438 A1 | 7/2009 | Arvind et al. | |
| 2009/0207423 A1 | 8/2009 | Shimizu et al. | |
| 2009/0210519 A1 | 8/2009 | Zill et al. | |
| 2009/0259863 A1 | 10/2009 | Williams et al. | |
| 2009/0307696 A1 | 12/2009 | Vals et al. | |
| 2010/0273450 A1 | 10/2010 | Papineau et al. | |
| 2011/0099402 A1 | 4/2011 | Zhang et al. | |

FOREIGN PATENT DOCUMENTS

| | | |
|---|---|---|
| CN | 101517510 A | 8/2009 |
| EP | 0910015 A1 | 4/1999 |
| JP | 2008-107914 A | 8/2008 |
| JP | 2009-223866 A | 1/2009 |
| JP | 2010-097427 A | 4/2010 |
| TW | I233545 | 6/2005 |
| TW | I556092 B | 11/2016 |
| WO | 01/15159 A1 | 3/2001 |
| WO | 2008/075137 A1 | 6/2008 |
| WO | 2013/049326 A2 | 4/2013 |
| WO | 2013/049326 A3 | 6/2013 |

OTHER PUBLICATIONS

Ravisha et al, Schedule PC booting, May 27, 2010, https://superuser.com/questions/145817/schedule-pc-booting.*

Certificate of Invention of Patent received for Chinese Patent Application No. 201280047653.4 issued as Patent No. ZL 201280047653.4 dated Aug. 15, 2017, 3 pages including 1 page of English translation.

Notice of Allowance received for Taiwanese Patent Application No. 101135077, dated Jun. 30, 2016, 3 pages including 1 page of English translation.

Communication received for European Patent Application No. 12837567.2, dated Mar. 18, 2016, 1 page.

Notice of Allowance received for Japanese Patent Application No. 2014-530976, dated Mar. 30, 2016, 4 pages of allowed claims in English included.

Office Action and Search Report received for Taiwanese Patent Application No. 101135077, dated Mar. 21, 2016, 7 pages including 1 page of English translation.

Office Action received for Chinese Patent Application No. 201280047653.4, dated May 5, 2016, 38 pages including 22 pages of English translation.

Extended European Search Report received for European Patent Application No. 12837567.2, dated Mar. 2, 2016.

Notice of Allowance received for Chinese Patent Application No. 201280047653.4, dated May 4, 2017, 4 pages including 2 pages of English translation.

International Search Report and Written Opinion received for PCT Patent Application No. PCT/US2012/057525, dated Mar. 18, 2013, 9 pages.

International Preliminary Report on Patentability and Written Opinion received for PCT Patent Application No. PCT/US2012/057525, dated Apr. 10, 2014, 6 pages.

Office Action received for Japanese Patent Application No. 2014-530976, dated Apr. 21, 2015, 7 pages including 3 pages of English translation.

"New Intel Atom Processor-Based Platform Using Significantly Lower Power Readies Intel for Smartphone, Tablet Push", news release, May 4, 2010, Intel Corporation, Santa Clara, CA.

Partial Supplementary European Search Report received for European Patent Application No. 12837567.2, dated Nov. 3, 2015, 8 pages.

Notice of Allowance received for Korean Patent Application No. 10-2014-7008097, dated Nov. 18, 2015, 3 pages including 1 page of English translation.

Office Action received for Chinese for Chinese Patent Application No. 201280047653.4, dated Sep. 2, 2015 28 pages including 16 pages of English translation.

Office Action received for Japanese Patent Application No. 2014-530976, dated Aug. 18, 2015, 9 pages including 5 pages of English translation.

Office Action received for Korean Patent Application No. 2014-7008097, dated Aug. 26, 2015, 9 pages including 4 pages of English translation.

Office Action received for European Patent Application No. 12837567.2 dated Jul. 24, 2018, 5 pages.

* cited by examiner

PRIORITY BASED APPLICATION EVENT CONTROL (PAEC) TO REDUCE POWER CONSUMPTION

CROSS REFERENCE TO RELATED APPLICATIONS

The present application is a division U.S. application Ser. No. 14/125,439 filed on Dec. 11, 2013, which in turns claims benefit of International Application No. PCT/US2012/057525 filed on Sep. 27, 2012, which claims priority to India Patent Application 2849/DEL/2011, filed Sep. 30, 2011. Said application Ser. No. 14/125,439, 2849/DEL/2011, and PCT/US2012/057525 are hereby incorporated herein by reference in their entirety and for all purposes.

FIELD

The present disclosure generally relates to the field of electronics. More particularly, an embodiment of the invention relates to Priority Based Application Event Control (PAEC) to reduce power consumption in computing devices.

BACKGROUND

Generally, one of the highest power consuming components in computing system is a processor. To reduce power consumption, some implementations may attempt to have the processor enter a sleep or standby mode as often and as long as possible. However, these attempts may be defeated due to occurrence of various events, e.g., triggered by other components in the system, which may force a processor to exit a lower power consumption state.

In turn, the higher power consumption may also increase heat generation. Excessive heat may damage components of a computer system. Further, the higher power utilization may increase battery consumption, e.g., in mobile computing devices, which in turn reduces the amount of time a mobile device may be operated prior to recharging. The additional power consumption may additionally require usage of larger batteries that may weigh more. Heavier batteries reduce the portability or usability of a mobile computing device.

Accordingly, overall system power consumption and utility may be directly related to how long a processor is maintained in a lower power consumption state.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof. Also, the use of "instruction" and "micro-operation" (uop) is interchangeable as discussed herein.

Some of the embodiments discussed herein may utilize Priority Based Application Event Control (PAEC) to reduce the number of application events that may cause a processor to exit a low power consumption state. In one embodiment, PAEC may be utilized in mobile devices or any other type of computing device. In an embodiment, PAEC techniques may leverage hardware (e.g., SoC (System on Chip) or On-Die System Fabric (OSF)) to assign priorities to applications ("apps") and associate these application priorities or applications with platform sub-system states (modes), e.g., to control platform events generated by both platform-power-aware and/or platform-power-unaware applications based on priority and/or policy configuration, e.g., without compromising QOS (Quality Of Service) or user experience. In one embodiment, PAEC provides fine grain power management by associating applications with the platform sub-system(s), e.g., to provide a mechanism to specify and/or prioritize which apps may wake the system or processor, which apps must/may run after system-wakeup or processor-wakeup, etc., and without impacting the QOS requirements and/or user experience.

In some embodiments, resumption of one or more applications (after a platform/system and/or a processor have entered a low power consumption state) may be restricted by the PAEC based on some policy (also referred to herein interchangeably as configuration) information or settings. This information may be adaptive and change during run-time in some embodiments. Furthermore, this policy information may include information regarding whether, in which order, when, and/or which of the one or more applications and/or their associated sub-system(s) are to be woken once the platform/system and/or the processor exits from the lower power consumption state. In an embodiment, the policy information may also indicate and/or prioritize which application and/or sub-system may wake the system.

Figure 1:
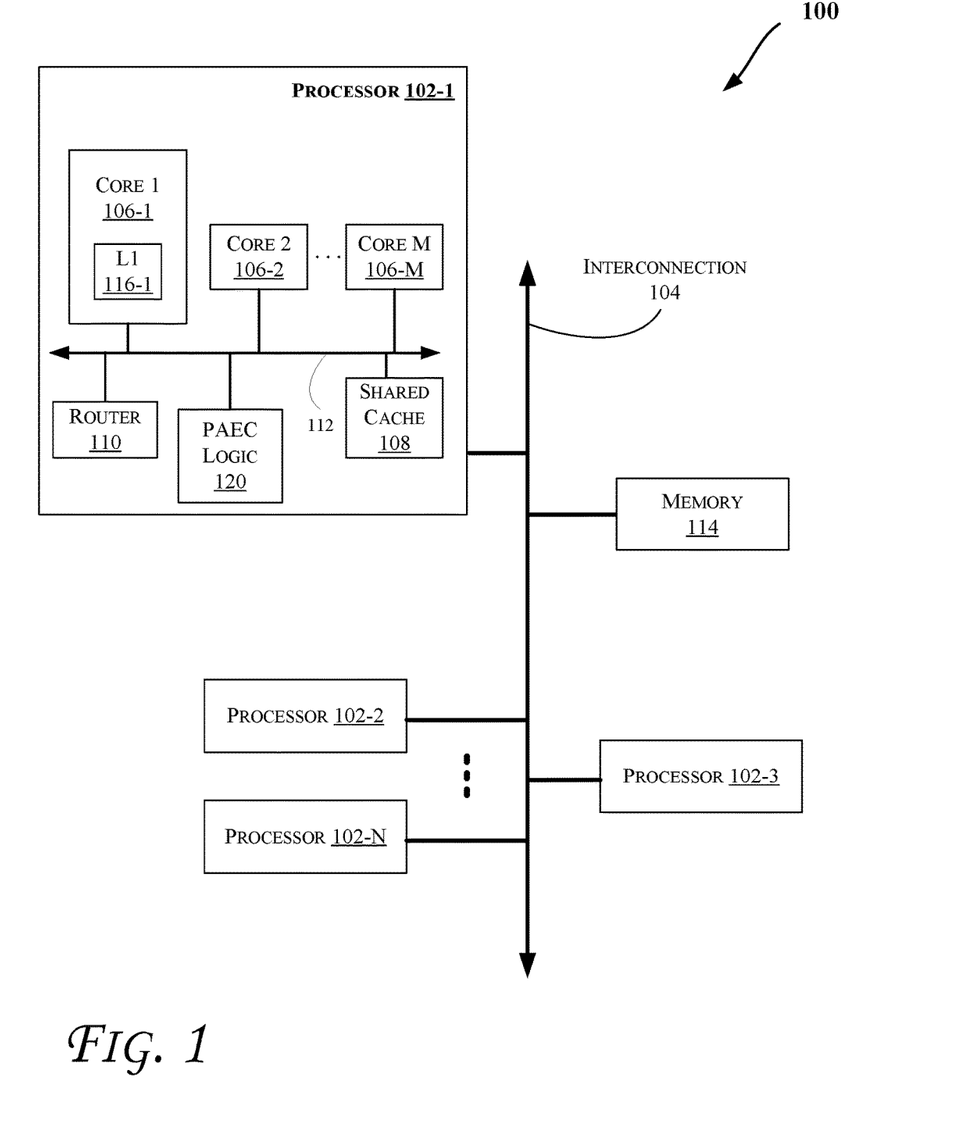
FIGS. 1, 3, and 5-6 illustrate block diagrams of embodiments of computing systems, which may be utilized to implement various embodiments discussed herein.

The techniques discussed herein may be used in any type of a computing system, such as the systems discussed with reference to FIGS. 1-2 and 5-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, a router 110, and/or a logic 120. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 5-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache 116-1 (generally referred to herein as "L1 cache 116").

In one embodiment, the PAEC logic 120 may reduce the number of application events that may cause a processor/platform to exit a low power consumption state and/or restrict resumption of operations by applications (and powering on of their corresponding sub-systems) after a processor/platform exits a low power consumption state. Logic 120 may assign priority to applications ("apps") that may be stored in memory 114 and may further associate the apps with platform sub-system states (modes), e.g., to control platform events generated by both platform-power-aware and/or platform-power-unaware applications based on application priority and/or policy configuration, e.g., without compromising QOS (Quality Of Service) or user experience. In some embodiments, operations performed by logic 120 may be controlled or configured via OS and/or software application(s) (e.g., that may be stored in the memory 114), e.g., per user or Original Equipment Manufactures (OEMs) (based on information from a User Interface (e.g., UI 314 of FIG. 3) in some embodiments). Additionally, information relating to the application priority and/or application policy configuration may be stored in any of the memories discussed herein, including for example, memory 114 and/or caches 108/116, etc.

Figure 2:
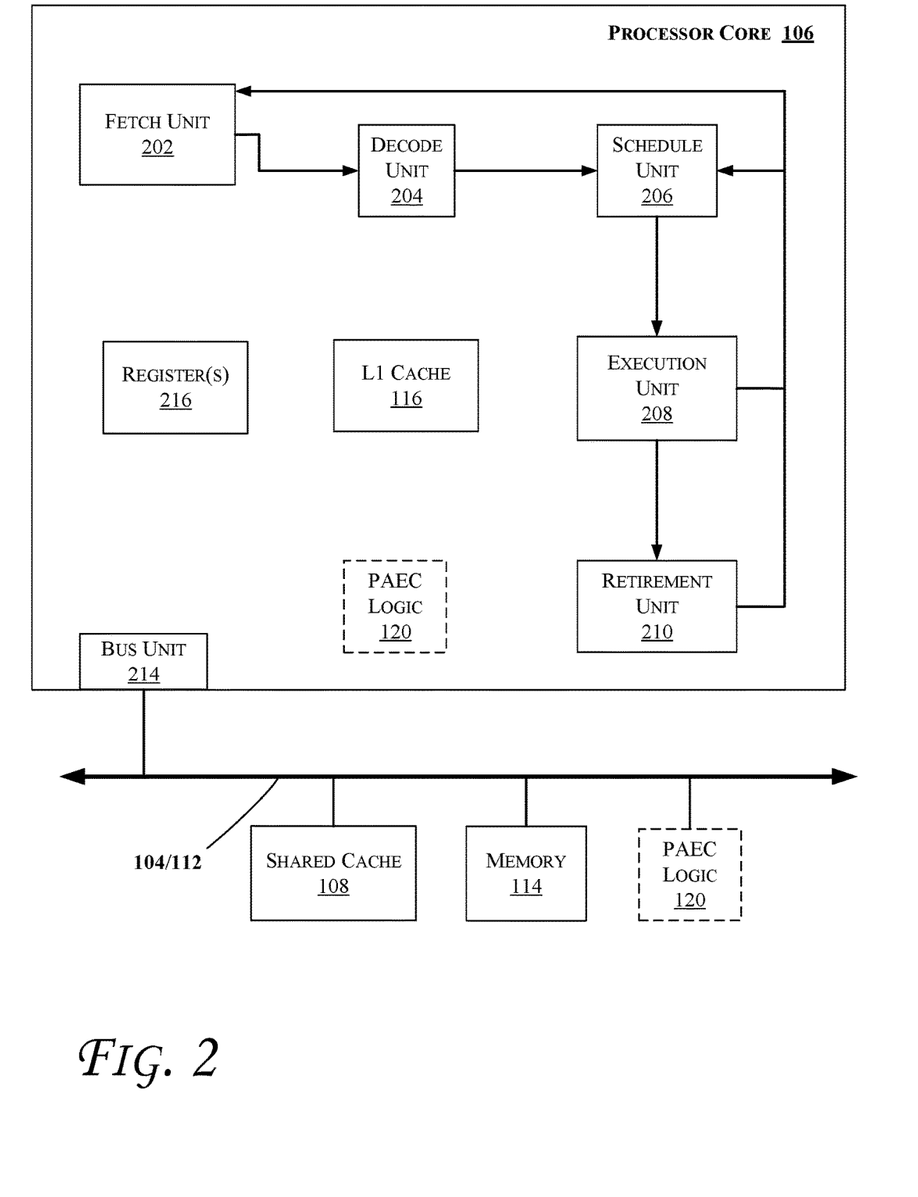
FIG. 2 illustrates a block diagram of portions of a processor core and other components of a computing system, according to an embodiment.

FIG. 2 illustrates a block diagram of portions of a processor core 106 and other components of a computing system, according to an embodiment of the invention. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), control units, memory controllers, or other components.

As illustrated in FIG. 2, the processor core 106 may include a fetch unit 202 to fetch instructions (including instructions with conditional branches) for execution by the core 106. The instructions may be fetched from any storage devices such as the memory 114 and/or the memory devices discussed with reference to FIGS. 5-6. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may also include a bus unit 214 to enable communication between components of the processor core 106 and other components (such as the components discussed with reference to FIG. 1) via one or more buses (e.g., buses 104 and/or 112). The core 106 may also include one or more registers 216 to store data accessed by various components of the core 106 (such as values related to assigned app priorities and/or sub-system states (modes) association.

Furthermore, even though FIG. 1 illustrates the PAEC logic 120 to be coupled to the core 106 via interconnect 112, in various embodiments the PAEC logic 120 may be located elsewhere such as inside the core 106, coupled to the core via bus 104, etc.

Moreover, the current generation of smart phones and netbooks platforms may support granular power management via OSPM (Operating System Power Management), PMU (Power Management Unit), and SCU (System Controller Unit). The SCU along with the Operating System may provide the Always On Always Connected (AOAC) capability to the platform. Based on the OS power manager's guidance, the SCU may determine the correct power level for different sub-systems (including CPU (Central Processing Unit) or processor) in the platform. External events like timer interrupt, interrupt from Communication (Comms) module, etc., may be forwarded by the SCU to CPU thereby waking up the CPU. Apart from subsystem interrupts, CPU also may be woken up by applications (apps) due to timers or events to provide AOAC functionality. These wake(s) reduce the residency time of the CPU in the sleep or deep sleep state, resulting in additional power consumption. Also, platform power-unaware apps may be active resulting in waking of the CPU and other sub-systems, even though the power manager entity has put the platform into standby/ sleep mode. In addition, applications may set timers and wake up the CPU periodically even though there is no change to a resource under consideration.

Furthermore, some current platforms may support coalescing of external events, and wait/deliver the events (wakes) based on some wake configuration. Current implementations generally have no way to assign priority to the applications in the platform and associate these application priorities with different operating modes of the platform (such as browsing, video playback, etc.), and as a result, apps may be frozen/thawed —put into sleep/deep sleep/standby state or forced to be in suspended state or allowed to be run. In addition, there is generally no existing mechanism to specify and prioritize which apps may wake the system from Suspended state and also, which apps must/may run once platform wakes up, etc. For example, in some current systems, SCU controls only the sub-system states and not the apps associated with them. Also, current methodologies generally fail to consider the QOS or user experience impact on application/sub-system that are forced into sleep/standby state.

Figure 3:
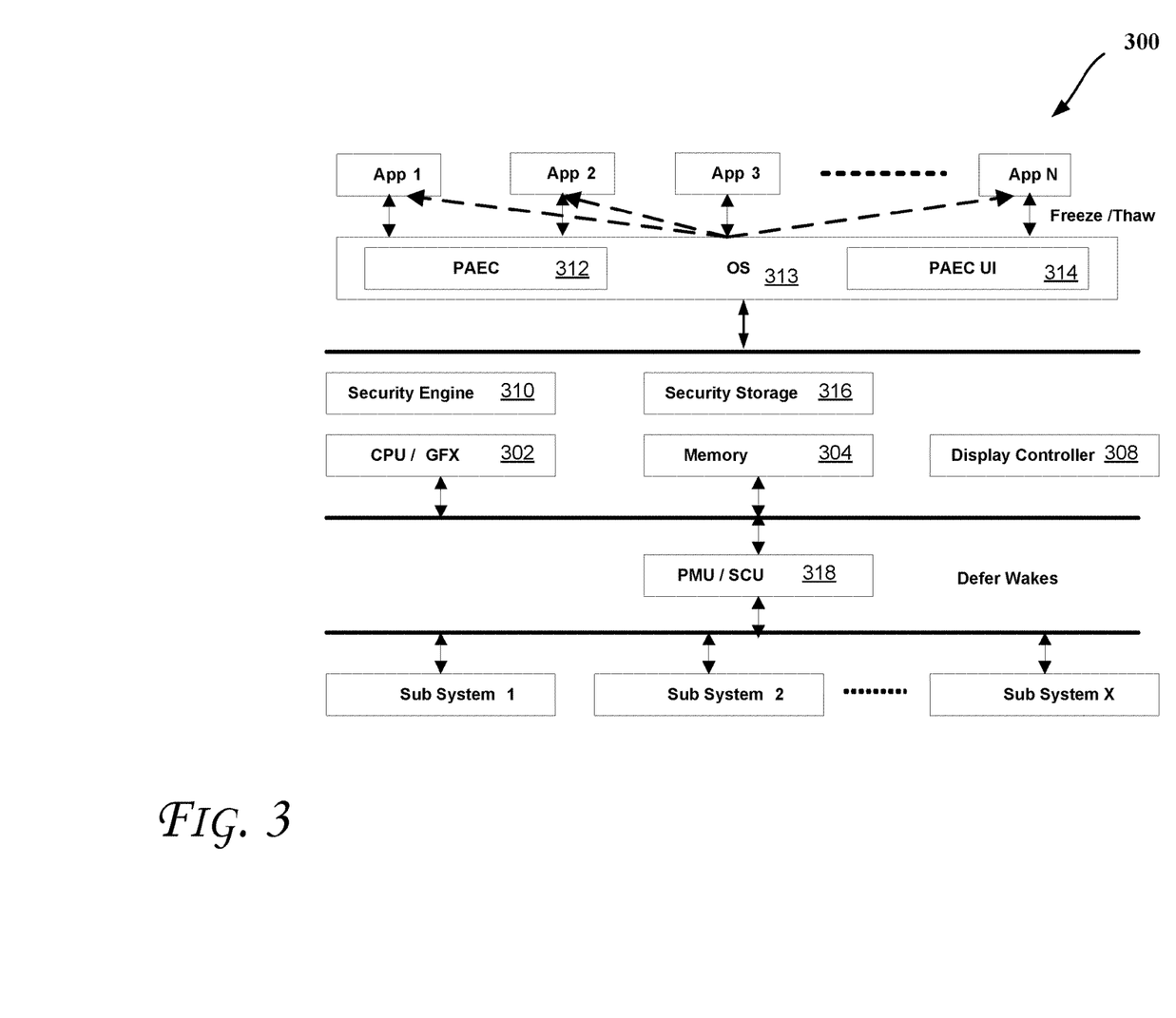

FIG. 3 illustrates a block diagram of a system 300 in which PAEC techniques may be implemented, according to some embodiments. To provide the compute and storing capability, system 300 may include a host CPU (or GFX (Graphics) 302 (such as the processors discussed with reference to FIGS. 1-2 and 5-6), memory 304 (such as the memories discussed with reference to FIGS. 1-2 and 5-6), and drives (e.g., as part of sub systems 1 through X). Generally, the sub-systems shown (e.g., 1, 2, through X) may include any component in a computing system such as the components discussed with reference to FIGS. 1-2 and 4-6, that are capable of being power gated and/or capable of waking a computing system/platform and/or processor.

Furthermore, system 300 may include a display controller 308 to provide display capabilities, a hardware Security Engine 310 to provide any necessary cryptographic operations and/or a tamper proof execution environment, a PAEC component 312 implemented as an OS component to run inside the OS 313 (wherein PAEC 312 may be tightly integrated with the scheduler of the OS 313 and an OS power manager in one embodiment and have the ability to halt/freeze/thaw a currently-running process/program and resume later in some embodiments), a PAEC UI (User Interface) 314 (which may be an application component in accordance with one embodiment) to provide the ability for an administrator or user to specify priority and/or associate them with the modes of the sub-systems in the platform, a Secure Storage 316 to provide a tamper proof secure storage that stores the PAEC policy configured by user/administrator information, and a SCU (System Controller Unit) and/or PMU (Power Management Unit) 318 to provide fine-grained platform power management support.

Figure 4:
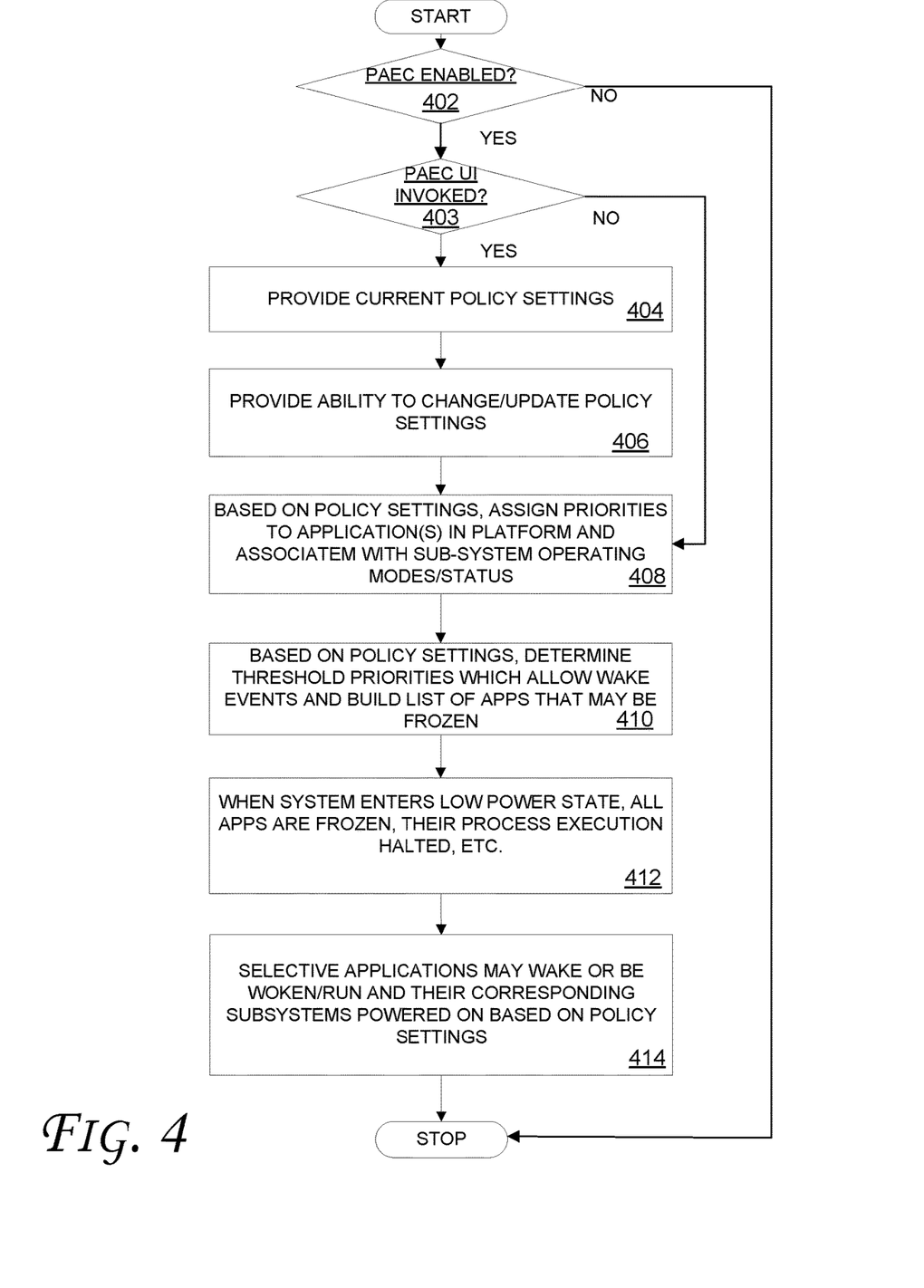
FIG. 4 illustrates a flow diagram in accordance with some embodiments.

FIG. 4 illustrates a flow diagram of a method for implementing PAEC, according to some embodiments. In an embodiment, FIG. 4 illustrates the operation of the PAEC logic 120, PAEC component 312, and/or PAEC UI 314 in accordance with some embodiments. Furthermore, the operations discussed with reference to FIG. 4 may be performed by one or more components of FIGS. 1-3 and 5-6.

Referring to FIGS. 1-4, once PAEC functionality is enabled at 402 and/or PAEC UI is invoked at 403 (e.g., by a user/OEM/OS/etc. and per some stored value such as a bit), the PAEC UI 314 may provide the user with the current policy settings stored in the security storage 316 at 404. PAEC UI 314 may provide the user with option(s) to change the policy and/or priority settings at 406. At 408, PAEC UI 314 may allow a user or administrator to assign priority to the applications and associate them with sub-system operating mode(s) (e.g., Browsing, Video playback, etc.), e.g., to update the policy settings.

In an embodiment, priority may be assigned by an OEM, OS, or apps provider at 408. Furthermore, priority may be determined and assigned based on QOS API (Application Program Interface) requirements placed by the app during application registration, in an embodiment. Power aware apps may use the QOS API to specify their QOS requirements that PAEC mechanism (e.g., items 120 or 312) uses, e.g., as a vector, to determine the priority of the apps. Based on the policy settings, PAEC determines the threshold priorities which allow wake events and builds a list of apps that are to be frozen after system/platform resume at 410. The threshold priority may also determine how long PAEC may defer events before it wakes up the CPU in an embodiment.

At 412, when the platform is about to enter a (e.g., SOix) platform low power state, all applications are frozen and the process execution halted (e.g., by PAEC mechanism 120 or 312), e.g., based on some priority scheme and policy settings. "SOix" generally refers to improved idle power state(s) achieved by platform-level power management that is event driven (e.g., based on OS or software application input) instead of traditional idle power state that is periodic or based on a polled activity. In some embodiments, at least some of the power consumption states discussed herein may be in accordance with those defined under Advanced Configuration and Power Interface (ACPI) specification, Revision 4.0a, Apr. 5, 2010, including for example, C0 which may indicate the processor is operating, C1 which may indicate the processor is not executing instructions but may return to an executing state almost instantaneously, C2 which may indicate the processor is to maintain all software-visible information but may take longer to return to full executing state, C3 which may indicate the processor is sleep and does not need to keep its cache coherent, etc.

In one embodiment, PAEC mechanism (e.g., items 120 or 312) freezes application(s) based on the information obtained during application registration or invocation. In some embodiments, at 412, for exceptional apps that PAEC should not freeze, PAEC may be configured to assign the highest/lowest priority available to those applications to allow for their wake events to land in the CPU accordingly. PAEC may send a notification about these apps to user (if configured), for example, via the PAEC UI 314, or log information about these apps. This allows the user to override the default settings in the future.

At 414, based on the configuration settings, PAEC mechanism (e.g., items 120 or 312) may allow or restrict selective apps to wake the system/processor or be run post resume (from a low power consumption state such as SOix) to keep the corresponding sub-system in a low-power state and increase the CPU residency in the low power state. Also, PAEC mechanism (e.g., items 120 or 312) may keep track of the wake events during platform (e.g., SOix) low power consumption state(s) to provide feedback on the policy settings to the policy manager for fine tuning of the parameters. This allows PAEC to be adaptive, e.g., by keeping track of the wake events during runtime.

In various embodiments, PAEC is establishes a relationship between applications and sub-system power states to provide greater flexibility to OS/applications/Power Manager logic to reduce power in a very granular fashion. Also, PAEC may be adaptive and may not impact the QOS or user experience in the platform. In some embodiments, PAEC is configurable and may be integrated with other components such as malware program, parental control, etc. to restrict specific apps. PAEC may reduce wakes and keep a CPU in longer idle states. App developers may leverage the QOS API to improve user experience with enhanced power savings. In some embodiments, PAEC associates applications with platform sub-system operational modes and provides options to wake/run selective applications after resuming from low power states (such as wakes from SOix states).

In an embodiment, PAEC is capable of masking wake events from selective sub-systems/apps based on policy settings. Further, PAEC may coalesce and deliver low priority wakes at a later time frame. And, PAEC may freeze applications based on their priority settings and/or their associated sub-system status, e.g., to avoid sub-systems to be turned on during low power (e.g., SOix) states, without compromising user experience or QOS. There may also be more user control of the configuration "knobs" per-application-basis (for security optimization, etc.). And, PAEC may provide the ability to securely store the policy settings on the secure storage.

In some embodiments, PAEC may provide several advantages including one or more of the following: (1) An ability to assign priorities to the applications in the platform and associate the applications with the sub-system operating modes. Priorities may be assigned by apps provider/system administrator/service provider or based on user configurable policy settings as well. Moreover, an embodiment allows apps to be categorized based on their priority, for example, to provide easier app management. (2) PAEC may be configured to halt/freeze apps that are masked out in a overlay region to avoid their events. (3) PAEC provides mechanism to wake up selective applications and their associated sub-system based on configuration settings. PAEC provides fine granular control from OS/app perspective. (4) PAEC may be adaptive —e.g., track the wakes during suspended state and provides feedback to fine tune the parameters. (5) Increases the residency of the CPU and other sub-systems in deepest low power state. (6) Store user configuration policy in a tamper-proof, secure storage.

Figure 5:
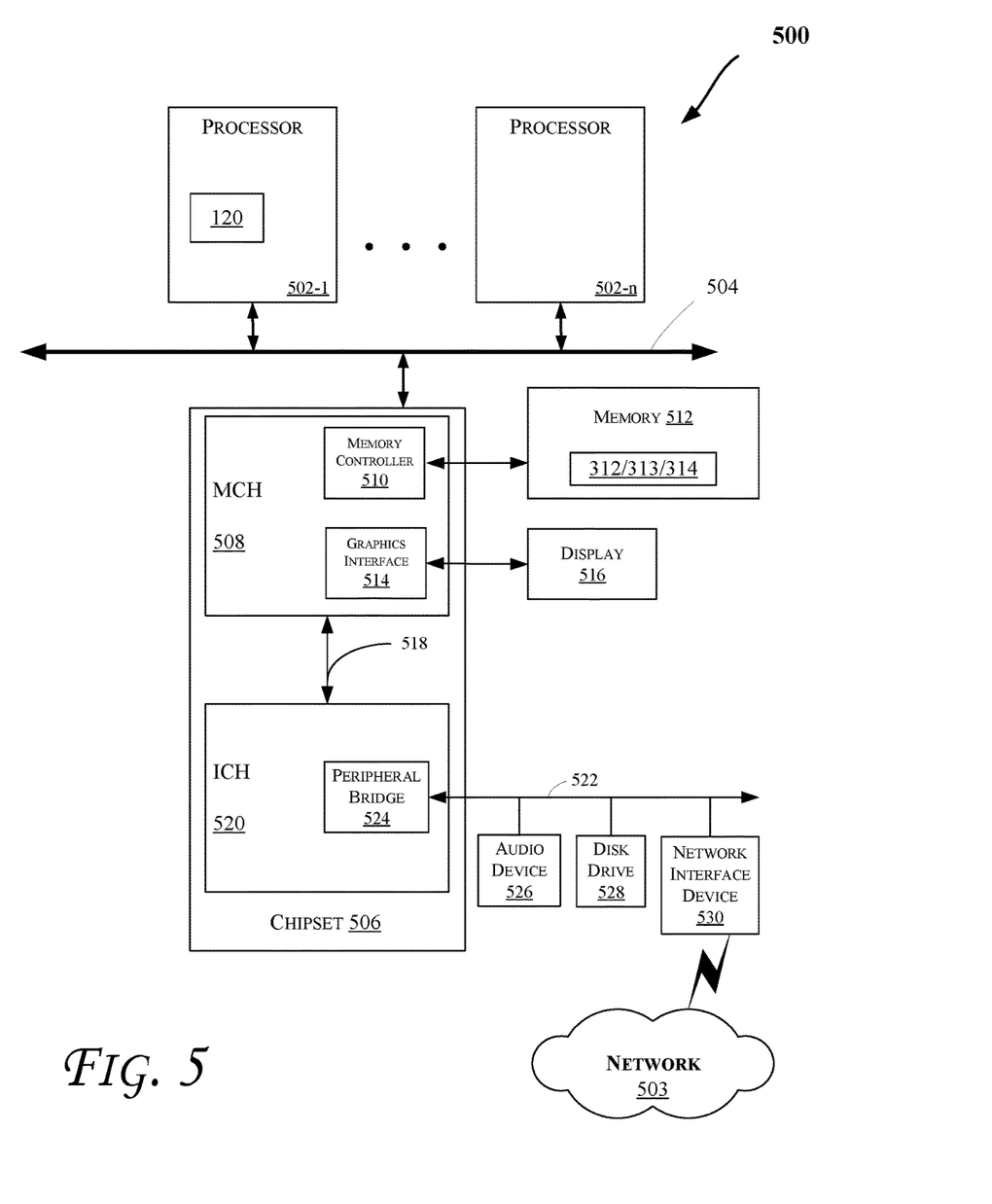

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. For example, one or more of the processors 502 may include the PAEC logic 120 discussed with reference to FIGS. 1-4. Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512 (which may be the same or similar to the memory 114 of FIG. 1). The memory 512 may store data, including sequences of instructions, that may be executed by the CPU 502, or any other device included in the computing system 500. For example, the memory 512 may store the PAEC 312, OS 313, and/or PAEC UI 314 discussed with reference to FIGS. 3-4. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The MCH 508 may also include a graphics interface 514 that communicates with a display device 516. In one embodiment of the invention, the graphics interface 514 may communicate with the display device 516 via an accelerated graphics port (AGP). In an embodiment of the invention, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the MCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, touch screen, camera, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the MCH 508 in some embodiments of the invention. In addition, the processor 502 and the MCH 508 may be combined to form a single chip. Furthermore, the graphics accelerator 516 may be included within the MCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
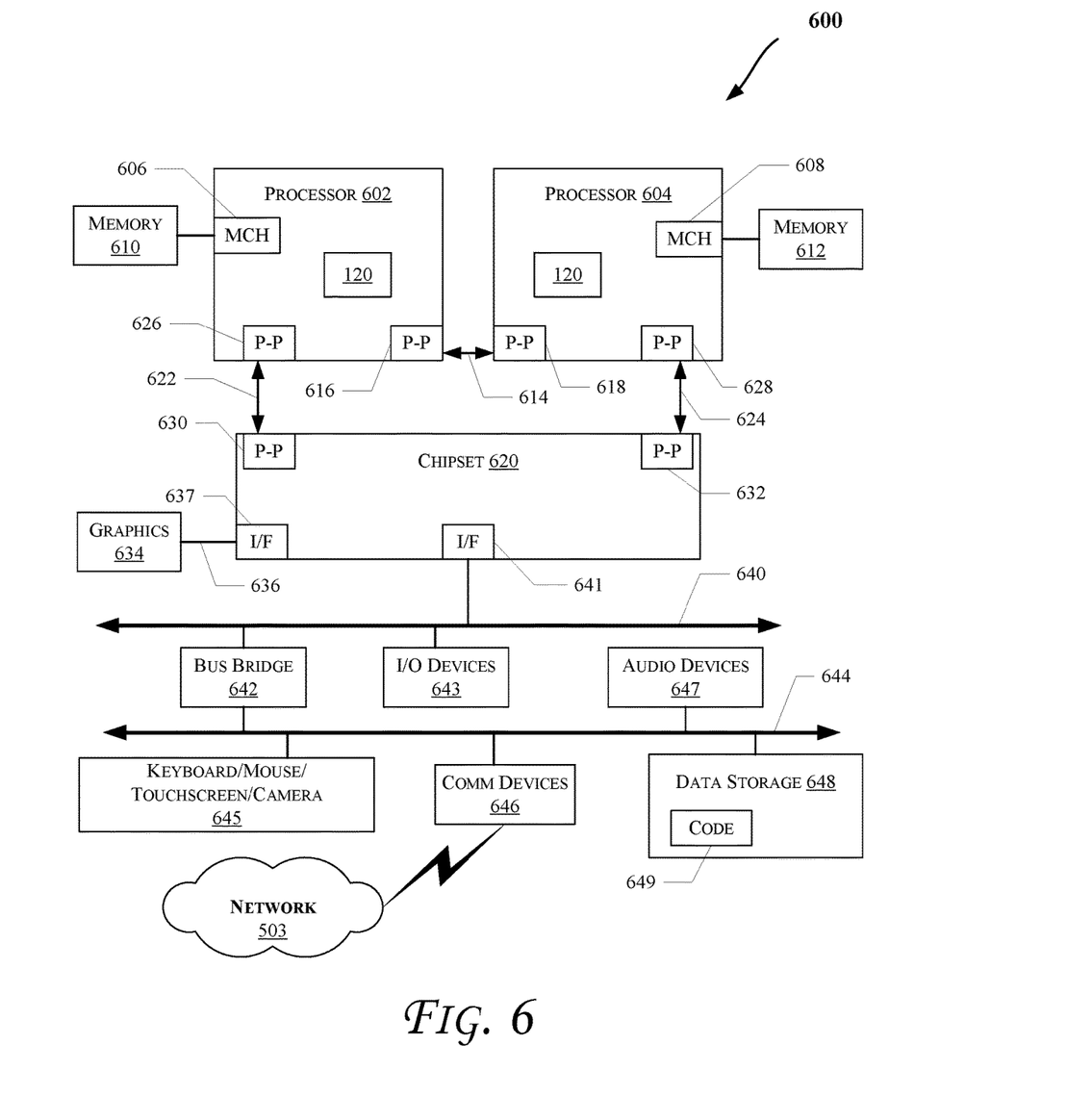

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention may be provided within the processors 602 and 604. For example, the PAEC logic 120 of FIGS. 1-4 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse/touchscreen/camera 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including (e.g., a non-transitory) machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    a processor; and
    logic circuitry, coupled to the processor, to allow one or more of a plurality of applications to cause the processor to exit from a low power consumption state based on policy information corresponding to the plurality of applications; and
    memory to store the policy information,
    wherein the policy information is to indicate a priority of which one of the plurality of applications is to be allowed to cause the processor to exit from the low power consumption state.

2. The apparatus of claim 1, wherein the logic circuitry is to allow one or more sub-systems, corresponding to the one or more of the plurality of applications, to cause the processor to exit the low power consumption state based on the policy information.

3. The apparatus of claim 2, wherein the policy information is to indicate which of the one or more sub-systems corresponds to which of the one or more of the plurality of applications.

4. The apparatus of claim 2, wherein the policy information is to indicate which power state of the one or more sub-systems corresponds to which of the one or more of the plurality of applications.

5. The apparatus of claim 1, wherein the logic circuitry is to prioritize which of the one or more of the plurality of applications are allowed to wake the processor from the low power consumption state.

6. The apparatus of claim 1, wherein the plurality of applications comprise one or more platform-power-aware or one or more platform-power-unaware applications.

7. The apparatus of claim 1, wherein the processor comprises a plurality of processor cores.

8. The apparatus of claim 1, wherein one or more of the memory, the processor, and the logic circuitry are on a same integrated circuit device.

9. A computer-readable medium to store instructions that when executed by a processor cause the processor to:
    allow one or more of a plurality of applications to cause the processor to exit from a low power consumption state based on policy information corresponding to the plurality of applications, wherein the policy information indicates a priority of which one of the plurality of applications is to be allowed to cause the processor to exit from the low power consumption state.

10. The computer-readable medium of claim 9, wherein the instructions are to cause the processor to allow one or more sub-systems, corresponding to the one or more of the plurality of applications, to cause the processor to exit the low power consumption state based on the policy information and before the processor exits the low power consumption state.

11. The computer-readable medium of claim 10, wherein the policy information indicates which of the one or more sub-systems corresponds to which of the one or more of the plurality of applications.

12. The computer-readable medium of claim 10, wherein the policy information indicates which power state of the one or more sub-systems corresponds to which of the one or more of the plurality of applications.

13. The computer-readable medium of claim 9, wherein the instructions are to cause the processor to prioritize which of the one or more of the plurality of applications are allowed to wake the processor from the low power consumption state.

14. The computer-readable medium of claim 9, wherein the plurality of applications comprise one or more platform-power-aware or one or more platform-power-unaware applications.

15. The computer-readable medium of claim 9, wherein memory, coupled to the processor, is to store an operating system software.

* * * * *